United States Patent [19]

Parker

[11] Patent Number: 4,575,142

[45] Date of Patent: Mar. 11, 1986

[54] SAFETY GRIP HANDLE FOR A HOSE

[75] Inventor: Fayne P. Parker, Memphis, Tenn.

[73] Assignee: Witco Chemical Corporation, New York, N.Y.

[21] Appl. No.: 650,119

[22] Filed: Sep. 13, 1984

[51] Int. Cl.[4] ..................... B65G 7/12

[52] U.S. Cl. ..................... 294/15; 294/1.1; 294/19.1

[58] Field of Search ..................... 294/92, 26, 16, 15, 294/27, 1 R, 19 R, 28, 30, 119, 118, 113, 3, 28; 401/137, 139, 261, 265, 195; 15/105, 236 R

[56] References Cited

U.S. PATENT DOCUMENTS 4,502,866 3/1985 Albertson ..................... 294/19.1

*Primary Examiner*—James B. Marbert
*Attorney, Agent, or Firm*—Wallenstein, Wagner, Hattis, Strampel & Aubel, Ltd.

[57] ABSTRACT

A safety grip handle for use with a hose of the type employed to direct a stream or spray of steam, hot water, chemicals, or the like, at an object or work area. The handle acts to position the hand, and the body, of an operator away from the nozzle of the hose and the hose itself.

4 Claims, 3 Drawing Figures

SAFETY GRIP HANDLE FOR A HOSE

TECHNICAL FIELD

The present invention relates to a handle for use with a hose of the type employed to convey potentially harmful substances such as steam, hot water, chemicals, and the like.

BACKGROUND OF THE PRIOR ART

It is common practice in chemical plant operations, as well as other manufacturing facilities, to hose-down equipment and work areas with steam or hot water, or, in certain instances, with chemicals capable of dissolving grease, oil, and other hard to remove contaminants. Personnel assigned to such clean-up jobs usually wear canvas, or other type protective gloves, and maneuver the hose by gripping it at the nozzle end. The hoses used for such purposes range from about one inch to one and a half inches in diameter, and substances such as steam or hot water are conveyed through the hose at pressures of the order of 100 to 200 psig. The temperature of such substances as they pass out of the nozzle of the hose is in the range of 200° F. to 210° F. The person using the hose is required to grasp it at the nozzle in order to properly control and direct the fluid stream passing out of the nozzle. This practice, of course, positions the gloved hand of the person using the hose extremely close to the potentially harmful substances being sprayed from the hose. Over and above this consideration, the size of the hose, and the pressures at which fluids pass through it, require the user to apply a strong grip to the hose, a circumstance which necessitates frequent switching of hands by the user due to fatigue. Switching of the hose from one hand to the other can result in injury to the user, or to a fellow worker, due to loss of the user's grip on the hose, or misdirection of the spray coming from the hose. In this same connection, protective gloves, while providing some protection against heat transferred through the hose, can, in time, absorb sufficient heat to require the user to change hands, leading to possible injury for the reasons noted above.

BRIEF SUMMARY OF THE INVENTION

In accordance with the present invention, a handle arrangement has been evolved which is uniquely adapted for use with a hose for spraying potentially harmful substances such as steam, hot water, chemicals, and the like. The handle arrangement includes a gripping portion which, when grasped, positions the hand of a user a safe distance away from the nozzle of the hose, and the surface of the hose itself, while at the same time enabling a user to easily manipulate the nozzle end of the hose. The dimensions of the gripping portion are such that it can be grasped by one hand of a user and comfortably held for extended periods of time, thereby eliminating the need for frequent hand changes, due to fatigue, which characterized the prior practice of grasping the hose itself. Stop means are provided on the gripping portion to prevent the hand of a user from slipping off. The handle arrangement further includes releasable clamp means which permit it to be readily attached to and detached from a hose with a simple tool such as a pair of pliers or a small wrench.

DETAILED DESCRIPTION OF THE INVENTION

Figures 1, 2, 3:
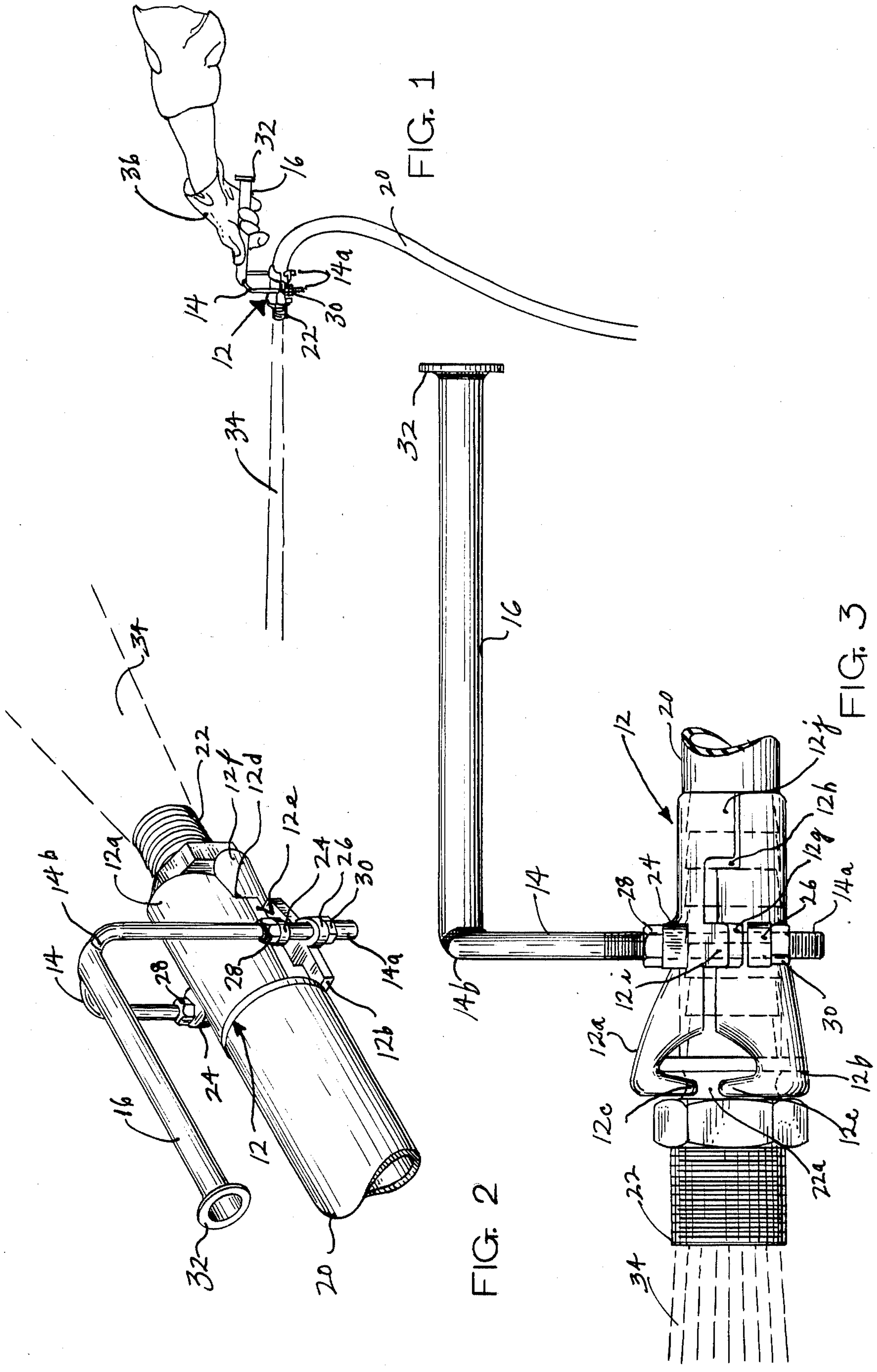
FIG. 1 is a view in perspective of an embodiment of the safety grip handle of this invention shown mounted on the nozzle end of a hose and being used by an operator to manipulate said end of the hose.
FIG. 2 is another view in perspective of said embodiment of the handle mounted on the nozzle end of a hose.
FIG. 3 is a side view in elevation of said embodiment of the handle shown mounted on the nozzle end of a hose.

As best illustrated in FIGS. 2 and 3 of the drawing, the embodiment of the invention shown, and designated generally by reference numeral 10, comprises hose clamp means 12, handle support means 14, and a gripping portion or handle 16. The clamp means 12 advantageously includes a pair of curved, interengaging members **12*a* and 12*b* each of which is provided at one end with an inwardly extending, arcuate jaw or hose-engaging lip 12*c*, the inner margin of which is curved to enable it to conform to the curvature of a hose 20, or, as shown in the drawing, to conform to the curvature of a nozzle 22 secured on the hose 20 and having an annular recess 22*a* formed therein for receiving the jaws or lips 12*c* of the members 12*a* and 12*b*. The member 12*a* of the clamp means 12 advantageously is cut back at its forward end to provide a shoulder 12*d* against which the inner edge 12*e* of a curved extension 12*f* at the forward end of the member 12*b* abuts. The member 12*b* desirably is stepped at its midpoint and at its rearwardmost end to provide recesses 12*g* and 12*h* for receiving curved extensions 12*i* and 12*j* formed at the midpoint and at the rearwardmost end of the member 12*a*. of the clamp means 12. The interlocking relationship between the extension 12*f* and the shoulder 12*d*, and the extensions 12*i* and 12*j*, and their corresponding recesses 12*g* and 12*h* of the members 12*a* and 12*b* acts to resist any longitudinally directed forces which otherwise may tend to disengage the clamp means 12 from its locked position on the hose 20**.

The side margins of the members **12*a* and 12*b* of the clamp means 12 are provided with outwardly extending ears 24—24 and 26—26, respectively. Each of the ears 24—24 and 26—26 has a bore therethrough. The bores in the ears 24—24 are in register with the bores in the ears 26—26 when the members 12*a* and 12*b* of the clamp means 12** are in position on a hose.

The handle support means 14 of the embodiment of the invention shown in the drawing advantageously is in the form of a U-bolt, the externally threaded free ends **14*a*—14*a* of which are received in the bores provided in the ears 24—24 and 26—26 on each side of the members 12*a* and 12*b*. A pair of nuts 28—28 and 30—30 are carried on the threaded ends 14*a*—14*a* of the handle support means 14. The nuts 28—28 and 30—30 are positioned on the outer side of the ears 24—24 and 26—26, and act to securely clamp the members 12*a* and 12*b* of the clamp means 12 on the hose 20 and its associated nozzle 22 when they are tightened against the ears 24—24 and 26—26. This arrangement also provides some flexibility in raising, or lowering, the handle 16 of the unit in relation to the hose 20**.

The gripping portion or handle 16 of the embodiment of the safety grip handle illustrated in the drawing desirably is formed of a length of metal pipe which is secured at one of its ends to the bight or curved portion 14*b* of the handle support means 14. It should be understood, of course, that the handle 16 may be fabricated of other materials such as high impact strength plastic, and that it can be shaped to provide any desired gripping surface called for. Stop means, which in the drawing is shown as a metal washer 32, is advantageously secured on the free or rearwardmost end of the handle 16 to prevent the handle 16 from slipping out of the grasp of an operator using the unit. The dimensions of the handle 16 are such that it can be easily grasped and firmly held by an operator while at the same time enabling the operator to effectively manipulate the nozzle end of the hose 20 to direct the spray 34 from the nozzle 22 at any desired object or area to be cleaned.

As shown in FIG. 1 of the drawing, the safety grip handle of this invention positions the gloved hand 36 of an operator well away from the nozzle of the hose and the hose itself. It also enables an operator to maintain the nozzle of the hose a safe distance from his body without in any way impeding his ability to aim the nozzle in any direction desired.

While one embodiment of the invention has been described herein with considerable particularity and illustrated in the drawing, it should be understood that various changes and modifications in the form, structure, arrangement and relationship of the components of said embodiment will occur to those skilled in the art without departing from the spirit and scope of the invention as set forth in the appended claims.

What is claimed is:

1. A safety grip handle for use with a hose having a nozzle for directing substances such as steam, hot water, chemicals, and the like, conveyed by the hose at an object or area to be contacted by the substance, comprising: hose engaging means including interlocking clamp means adapted to encircle and firmly engage the nozzle end of a hose, said clamp means having inwardly extending, arcuate jaws at one end thereof for engaging an end of the hose nozzle, said jaws acting to prevent both longitudinal and transverse movement of the hose nozzle relative to the longitudinal axis of the clamp means; U-shaped handle support means extending upwardly from said clamp means rearwardly of said arcuate jaws, said handle support means having leg portions releasably secured to the clamp means on opposite sides thereof and being adapted to maintain said clamp means in interlocked relation on the nozzle end of a hose; and a handle carried on the bight of said U-shaped handle support means, said handle extending rearwardly from the U-shaped handle support means in a direction away from the nozzle of the hose, and being supported by the U-shaped handle support means a sufficient distance from the nozzle end of the hose to prevent the hand of an operator from coming into contact with substances such as steam, hot water, or chemicals passing from the nozzle of the hose.

2. A safety grip handle according to claim 1 wherein the clamp means comprises a pair of releasably, interengaged members having a curvature to enable them to encircle, and substantially conform to the curvature of a hose.

3. A handle according to claim 1 wherein the leg portions of the U-shaped handle support means releasable locking means for attaching the clamp means on and detaching it from a hose.

4. A safety grip handle according to claim 1 wherein the handle carried on the U-shaped handle support means is secured at one end to the bight of the U-shaped handle support means, and is provided with stop means to limit the extent of the rearward movement of the hand of a user therealong during use of the safety grip handle.

* * * * *